Oct. 23, 1956

H. OKABE 2,768,315

ELECTRIC TACHOMETERS

Original Filed Dec. 22, 1952

*INVENTOR.*
HICHIRO OKABE
BY
Horace B. Van Valkenburgh
ATTORNEY

United States Patent Office 2,768,315
Patented Oct. 23, 1956

2,768,315

ELECTRIC TACHOMETERS

Hichiro Okabe, Hiratsuka City, Japan

Continuation of abandoned application Serial No. 327,347, December 22, 1952. This application June 25, 1953, Serial No. 364,059

2 Claims. (Cl. 310—86)

This invention relates to tachometers, and more particularly to an electrical tachometer adapted to indicate the rotational speed of a moving part. This application is a continuation of my application (now abandoned) Serial No. 327,347, filed December 22, 1952, entitled "Electric Tachometer."

For indicating the speed of a rotating part, it is often inconvenient or undesirable to attach a speed indicator to the part itself, particularly if it is rotating within a space filled with oil or other liquid, or at a pressure different than atmospheric, such as under vacuum or at a pressure higher than atmospheric. Such a connection between the rotating part and a speed indicator usually requires a stuffing box or packing gland, which involves either the possibility of leakage of gas or fluid to or from the space in which the part rotates, requires additional or an undue amount of power, or involves an unduly expensive construction. Furthermore, any such seal may tend to leak, upon continued use, and thereby introduces an additional operational difficulty.

Among the objects of the present invention are to provide a novel electric tachometer or speed indicating device; to provide such a tachometer by which the speed of a part rotating within an enclosed space, such as within a housing, may be indicated; to provide such a tachometer which requires no physical connection, such as a shaft, extending through the wall of the housing; to provide such a tachometer which may be installed with relative ease and at low cost; to provide such a tachometer which may exist in more than one form; and to provide such a tachometer which will be economical to manufacture.

Additional objects and novel features of this invention will become apparent from the following description, taken in connection with the accompanying drawing, in which.

Figure 1:
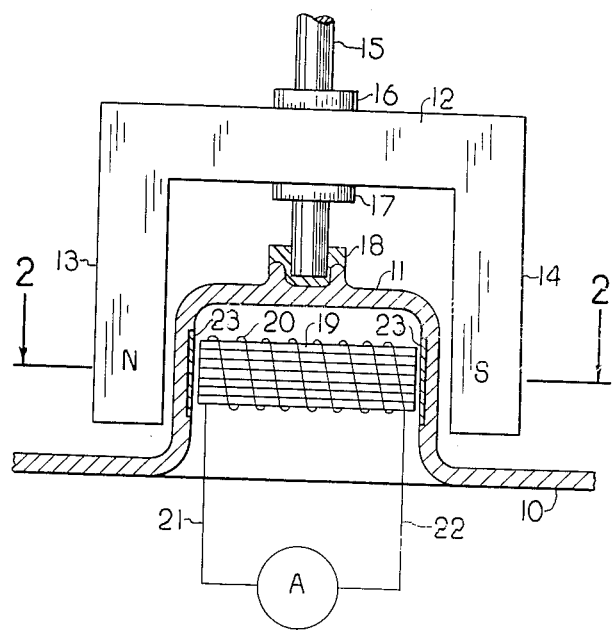
Fig. 1 is an axial section, with certain parts shown diagrammatically, of an electric tachometer constructed in accordance with this invention, in operative position relative to a rotating shaft whose speed is to be indicated.
Figure 2:
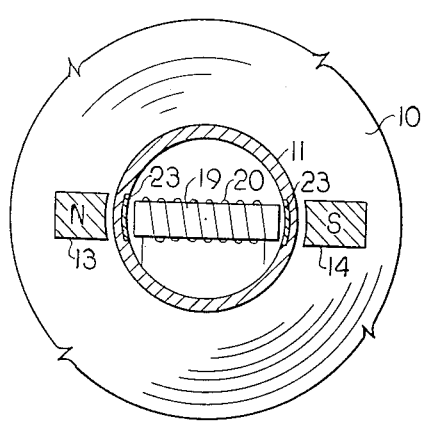
Fig. 2 is a transverse section taken along line 2—2 of Fig. 1.

An electrical tachometer of this invention, as illustrated in Figs. 1 and 2, may be installed in operative position relative to a housing 10, formed of plastic, Bakelite or other non-magnetic and non-metallic material, or a non-magnetic metallic material, such as aluminum. The housing 10 encloses a space filled with oil or other liquid, or with a gas or air at a pressure either above or below atmospheric or the pressure outside the housing; or the space within the housing may be a vacuum of any degree. The housing 10 is provided with a well 11 having an annular side wall about which a permanent magnet 12, having a north pole 13 and a south pole 14 is rotated by the part whose speed is to be measured, such as a shaft 15. The magnet 12 may be attached to the shaft in a suitable manner, such as by collars 16 and 17, either one of which may be integral with the shaft 15 with the opposite collar threadedly attached to the shaft 15, or either of which may be a nut or the like. The extending end of shaft 15 may be received in a bearing 18, mounted on the inside of well 11 and formed of the same or a different material than the housing 10, preferably non-magnetic, or may be integral with the housing. Also, the bearing may be of a type other than the sleeve type shown, while the end of the shaft may run free, depending upon the necessity for guidance and support of the shaft at that point.

A rectangular, laminated core 19, whose laminations preferably extend perpendicularly with respect to the axis of shaft 15, as shown, forms the core for a coil 20 wound thereabout and connected by leads 21 and 22 with a meter A, which indicates the amount of current inducted in coil 20 due to rotation of the magnet 12, such current being proportional to the speed of shaft 15. The readings of meter A should, of course, be calibrated with respect to each individual installation.

In addition, an insert 23 of magnetic material, such as a curved bar opposite each end of core 19 is positioned in or attached to the wall of the housing which, as indicated previously, is made of non-magnetic material. The core 19 and the inserts 23 may be made of the same or different material, preferably having a low hysteresis coefficient. The magnetic inserts 23 are conveniently placed on the outside wall of the well 11 and embedded in the surface thereof, that is, facing or opposite the ends of the laminations of core 19, although inserts 23 may, if desired, be placed on the inside of the well facing the poles of the magnet 12. Also, the magnetic insert may comprise finely divided magnetic material embedded within the non-magnetic material of which the housing 10 is made, such as when the housing is made of plastic and molded or made of aluminum and cast. The inserts 23 decrease the resistance to passage of magnetic flux from the poles of the magnet 12 to the core 19, and thereby tend to increase the magnetic flux supplied to the core 19, in turn increasing the current generated in coil 20. This in turn increases the reading of meter A, thereby tending to permit lower speeds to be measured more accurately, and also differences between increments of speed, at higher speeds, to be measured more accurately. The meter A may be an ammeter or a millivolt meter, as of the moving coil type, or the alternating current produced in the coil 20 may be converted into direct current by a suitable electrical circuit, such as including a thermo-junction. Thus, the means for indicating the current induced in coil 20 may be of any suitable type.

Figure 3:
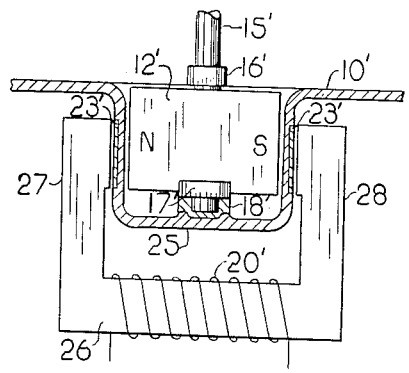
Fig. 3 is an axial section similar to Fig. 1, but illustrating an additional embodiment of this invention.

It will be noted that, in the embodiment of Figs. 1 and 2, the well 11 extends into the space enclosed by housing 10, and that the magnet 12 is U-shaped or what may be termed "horseshoe" shaped, and that therefore the magnet 12 and well 11 occupy a space within the housing 10. Such a construction is satisfactory when space is not at a particular premium, for instance. However, if desired, and also when space within the housing may be at a premium or the rotating parts connected to the shaft should extend to or substantially to the outer line of the housing wall, the construction illustrated in Fig. 3 may be utilized, wherein a housing 10', formed of non-magnetic material as described previously, is provided with a convex well 25, within which a permanent bar magnet 12', having opposite ends adapted to provide north and south poles, is mounted on the extending end of a shaft 15', as by being attached between collars 16' and 17', which may be circular collars, nuts or the like. As before, the extending end of shaft 15' may rotate in a bearing 18' attached to the well 25, and the outside of the well may be provided with inserts 23', similar to the inserts 23 of Fig. 1 and similarly formed of magnetic material. As before, the inserts 23' are preferably disposed opposite the ends of poles 27 and 28 of a U-shaped or "horseshoe" type core 26, the core 26, as before, conveniently being laminated and the bar portion thereof being surrounded by a coil 20', in turn connected to an ammeter or other suitable electrical measuring instrument, as in the case of the coil 20 of Fig. 1. As will be evident, the construction of Fig. 3 provides more space within the confines of the normal outline of the housing 10', than the construction of Fig. 1 with respect to the housing 10, although the construction of Fig. 3 requires more space outside the confines of the normal outline of the housing 10' than the construction of Fig. 1 with respect to the housing 10. Thus, each of the embodiments described above has certain particular advantages over the other, although where space requirements inside or outside the housing are not a factor, either construction may be utilized. As will be evident, no physical connection between the shaft 15 or 15' and the parts of the tachometer outside the housing is necessary.

As will be evident, various changes may be made in the tachometer of this invention. Thus, the magnets 12 and 12' may be made of any material suitable for a permanent magnet, while the housing may be made of non-magnetic material adjacent the well and of magnetic material at positions spaced sufficiently therefrom that the operation of the tachometer is not unduly affected. While several different types of material suitable for the housing 10 or 10' have been indicated, it will be understood that other non-magnetic material may be utilized, and also that the shape and size of the wells 11 and 25, as well as the magnets and the cores for the coils may be varied considerably.

It will further be understood that additional embodiments of this invention may exist and various changes made therein, all without departing from the spirit and scope of this invention.

What is claimed is:

1. An electric tachometer for a rotating part within a housing, comprising a concave well forming part of said housing and having an annular side wall, said well and said housing at least at and adjacent said well being formed of non-magnetic material; a U-shaped permanent magnet having opposite poles and attached to said rotating part interiorly of said housing, with the poles of said magnet rotatable about the side wall of said well; a bar shaped core disposed within the space defined by said well exteriorly of said housing and with the ends thereof adjacent the side wall of said well opposite the path of rotation of said magnet poles; a coil wound about said core; a curved bar of magnetic material embedded in the surface of said well opposite each end of said core; and means for indicating the relative amount of current induced in said coil.

2. An electric tachometer for a rotating part within a housing, comprising a convex well forming part of said housing and having an annular side wall, said well and said housing at least at and adjacent said well being formed of non-magnetic material; a bar-shaped permanent magnet having opposite poles and attached to said rotating part interiorly of said well; a U-shaped core disposed exteriorly of said housing with the ends thereof adjacent the side wall of said well opposite the path of rotation of said magnet poles; a coil wound about said core; a curved bar of magnetic material embedded in the surface of said well opposite each end of said core; and means for indicating the relative amount of current induced in said coil.

References Cited in the file of this patent

UNITED STATES PATENTS

| | | |
|---|---|---|
| 591,395 | Fay | Oct. 12, 1897 |
| 1,119,648 | Sheldon | Dec. 1, 1914 |
| 1,308,435 | Maire | July 1, 1919 |
| 1,561,452 | Alden | Nov. 17, 1925 |
| 1,722,284 | Fisher | July 30, 1929 |
| 2,071,573 | Randolph et al. | Feb. 23, 1937 |
| 2,127,847 | Schulte | Aug. 23, 1938 |
| 2,258,064 | Myers | Oct. 7, 1941 |
| 2,270,141 | Potter | Jan. 13, 1942 |
| 2,450,982 | O'Brien | Oct. 12, 1948 |